United States Patent
Jia et al.

(10) Patent No.: US 11,735,979 B2
(45) Date of Patent: Aug. 22, 2023

(54) MOTOR ROTOR AND PERMANENT MAGNET MOTOR

(71) Applicant: GREE ELECTRIC APPLIANCES, INC. OF ZHUHAI, Zhuhai (CN)

(72) Inventors: Jinxin Jia, Zhuhai (CN); Xiaobo Zhang, Zhuhai (CN); Jianning Liu, Zhuhai (CN); Fang Zhang, Zhuhai (CN); Qiong Wei, Zhuhai (CN); Guanghai Li, Zhuhai (CN); Liming Peng, Zhuhai (CN); Bowen Xiong, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 264 days.

(21) Appl. No.: 17/313,145

(22) Filed: May 6, 2021

(65) Prior Publication Data

US 2021/0257884 A1 Aug. 19, 2021

Related U.S. Application Data

(63) Continuation of application No. PCT/CN2019/104168, filed on Sep. 3, 2019.

(30) Foreign Application Priority Data

Nov. 7, 2018 (CN) .......................... 201811319255.9

(51) Int. Cl.
*H02K 9/22* (2006.01)
*H02K 1/02* (2006.01)
*H02K 1/2706* (2022.01)
*H02K 7/00* (2006.01)

(52) U.S. Cl.
CPC ................. *H02K 9/22* (2013.01); *H02K 1/02* (2013.01); *H02K 1/2706* (2013.01); *H02K 7/003* (2013.01)

(58) Field of Classification Search
CPC .......... H02K 9/22; H02K 1/02; H02K 1/2706; H02K 7/003
USPC ........................................................ 310/179
See application file for complete search history.

(56) References Cited

FOREIGN PATENT DOCUMENTS

| CN | 203933192 U | 11/2014 |
|---|---|---|
| CN | 204741353 U | 11/2015 |
| CN | 107425632 A | 12/2017 |
| CN | 107579614 A | 1/2018 |

(Continued)

OTHER PUBLICATIONS

JP-5819193-B2 machine translation, Seban et al. (Year: 2015).*

(Continued)

*Primary Examiner* — Terrance L Kenerly
(74) *Attorney, Agent, or Firm* — Westbridge IP LLC

(57) ABSTRACT

Disclosed are a motor rotor and a permanent magnet motor. The motor rotor includes: a rotating shaft; a magnetic layer fixedly sleeved on the rotating shaft; a first heat diffusion layer wrapped on an outer surface of the magnetic layer away from the rotating shaft for preventing a shielding layer from overheating locally; and the shielding layer wrapped on a surface of the first heat diffusion layer away from the magnetic layer. The first heat diffusion layer is provided between the shielding layer and the magnetic layer of the motor rotor, so that the first heat diffusion layer can prevent the shielding layer and the magnetic layer from overheating locally, and improve heat dissipation efficiency of the shielding layer.

18 Claims, 2 Drawing Sheets

(56) References Cited

FOREIGN PATENT DOCUMENTS

| | | | | |
|---|---|---|---|---|
| CN | 108110928 | A | 6/2018 | |
| CN | 108390484 | A | 8/2018 | |
| CN | 207782529 | U | 8/2018 | |
| CN | 108711981 | A | 10/2018 | |
| CN | 109149821 | A | 1/2019 | |
| CN | 208835866 | U | 5/2019 | |
| DE | 102013219765 | A1 * | 4/2015 | ............. B32B 25/04 |
| JP | 2000050545 | A | 2/2000 | |
| JP | 2002247819 | A | 8/2002 | |
| JP | 2015500620 | A | 1/2015 | |
| JP | 5819193 | B2 * | 11/2015 | ............... H02K 1/02 |
| WO | 2017047253 | A1 | 3/2017 | |
| WO | 2017141477 | A1 | 8/2017 | |

OTHER PUBLICATIONS

DE-102013219765-A1 machine translation, Donner et al. (Year: 2015).*
International Search Report in corresponding PCT Application No. PCT/CN2019/104168, dated Nov. 28, 2019.
Written Opinion in corresponding PCT Application No. PCT/CN2019/104168, dated Nov. 28, 2019.
Extended European Search Report in counterpart European Patent Application No. 19882076.3, dated Nov. 9, 2021.
Notice of Reasons for Refusal issued in counterpart Japanese Patent Application No. 2021-523588, dated May 11, 2022.

* cited by examiner

MOTOR ROTOR AND PERMANENT MAGNET MOTOR

CROSS-REFERENCE TO RELATED APPLICATIONS

This application is a continuation application of International Application No. PCT/CN2019/104168, filed on Sep. 3, 2019, which claims priority to Chinese Patent Application No. 201811319255.9, filed on Nov. 7, 2018. Both of the aforementioned applications are hereby incorporated by reference in their entireties.

TECHNICAL FIELD

The present disclosure relates to the field of motor technologies, in particular to a motor rotor and a permanent magnet motor.

BACKGROUND

A high speed permanent magnet synchronous motor has many advantages such as high power density, good dynamic response and simple structure, and has become one of research hotspots in a field of international electrical engineering.

SUMMARY

According to one aspect of some embodiments of the present disclosure, a motor rotor includes: a rotating shaft; a magnetic layer fixedly sleeved on the rotating shaft; a first heat diffusion layer wrapped on an outer surface of the magnetic layer away from the rotating shaft for preventing a shielding layer from overheating locally; and the shielding layer wrapped on a surface of the first heat diffusion layer away from the magnetic layer.

In some embodiments, a first thermal conductivity of the first heat diffusion layer along a radial direction of the rotating shaft is smaller than a second thermal conductivity of the first heat diffusion layer along an axial direction of the rotating shaft.

In some embodiments, the first heat diffusion layer includes a first carbon fiber layer, a radial direction of the first carbon fiber layer is parallel to a thickness direction of the first heat diffusion layer, and a fiber direction of the first carbon fiber layer is parallel to an axial direction of the rotating shaft.

In some embodiments, the motor rotor further includes a second heat diffusion layer. The second heat diffusion layer wraps on an outer surface of the shielding layer away from the magnetic layer.

In some embodiments, the second heat diffusion layer includes a second carbon fiber layer. A radial direction of the second carbon fiber layer is parallel to a thickness direction of the second heat diffusion layer, and a fiber direction of the second carbon fiber layer is parallel to an axial direction of the rotating shaft.

In some embodiments, the second heat diffusion layer includes a plurality of metal heat conducting parts provided in the second carbon fiber layer. The plurality of metal heat conducting parts extend along the radial direction of the second carbon fiber layer for improving a thermal conductivity of the second carbon fiber layer along the radial direction.

In some embodiments, the first heat diffusion layer and the second heat diffusion layer are made of a same material, and a thickness of the first heat diffusion layer is greater than that of the second heat diffusion layer.

In some embodiments, the first heat diffusion layer is in interference fit with the magnetic layer.

In some embodiments, the magnetic layer is a ring permanent magnet; or, the magnetic layer includes a fixing device and a permanent magnet, the fixing device is fixedly sleeved on the rotating shaft, a mounting groove is provided on an outer surface of the fixing device away from the rotating shaft, and the permanent magnet is installed in the mounting groove.

In some embodiments, the magnetic layer includes the fixing device and the permanent magnet, and the fixing device is made of a heat storage material.

In some embodiments, the permanent magnet includes a neodymium magnet or a samarium cobalt magnet.

In some embodiments, a thickness of the shielding layer is greater than 0.03 mm and less than 1.5 mm.

The present disclosure also provides a permanent magnet motor, including any one of the motor rotors provided in the present disclosure.

The present disclosure provides the motor rotor and the permanent magnet motor. The first heat diffusion layer is provided between the shielding layer and the magnetic layer of the motor rotor. The first heat diffusion layer may prevent the shielding layer and the magnetic layer from overheating locally, and improve the heat dissipation efficiency of the shielding layer.

DESCRIPTION OF REFERENCE SIGNS IN THE FIGURE

Figure 1:
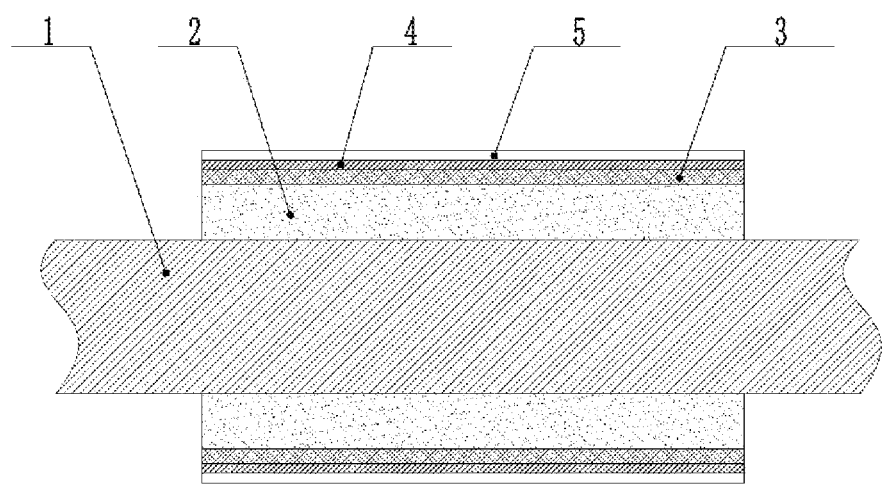
FIG. 1 is a schematic diagram of a motor rotor according to some embodiments of the present disclosure.

1—Rotating shaft; 2—Magnetic layer; 21—Fixing device; 22—Permanent magnet; 3—First heat diffusion layer; 4—Shielding layer; 5—Second heat diffusion layer.

DETAILED DESCRIPTION OF THE EMBODIMENTS

The technical solutions in the embodiments of the present disclosure may be described clearly and completely below with reference to the accompanying drawings in the embodiments of the present disclosure. Apparently, the described embodiments are only some embodiments of the present disclosure, not all of the embodiments. Based on the embodiments in the present disclosure, all other embodiments obtained by those skilled in the art without creative efforts shall fall within the protection scope of the present disclosure.

In the description of the present disclosure, it should be appreciated that the orientation or positional relationship indicated by terms "center", "longitudinal", "transverse", "front", "rear", "left", "right", "vertical", "horizontal", "top", "bottom", "inner", "outer", etc. are based on the orientation or positional relationship shown in the drawings, and are only for the convenience of describing the present disclosure and simplifying the description, rather than indicating or implying the referred device or element must have a specific orientation and be constructed and operated in a specific orientation, and therefore, it cannot be construed as limiting the protection scope of the present disclosure.

A permanent magnet in a rotor of the high speed motor is generally made of a permanent magnet material sintered with NdFeB. Since the permanent magnet material is compressive, but not tensile, in order to ensure that the permanent magnet has sufficient strength at high speeds, a layer of high-strength rotor sheath is usually wrapped around the permanent magnet. There is an interference fit between the rotor sheath and the permanent magnet to ensure that the permanent magnet still bears a certain compressive stress during operation, thereby ensuring a safe operation of the high speed motor.

Two kinds of sheaths are commonly used, one is a non-magnetic high-strength metal sheath, and the other is a carbon fiber binding type sheath. The carbon fiber cannot shield a harmonic magnetic field into the permanent magnet, so a large amount of eddy current loss is still generated in the permanent magnet. When the metal sheath is used, the metal sheath may generate the eddy current loss under an action of a high-frequency electromagnetic field, causing the sheath to heat up, and because the sheath is in close contact with the permanent magnet in the rotor, the heat in the sheath is easily transferred to the permanent magnet. When a temperature of the permanent magnet is too high, irreversible demagnetization may be generated, which may cause performances of the motor to be reduced or even damaged.

Therefore, improving heat dissipation efficiency of a shielding layer to prevent the shielding layer from overheating locally while shielding an electromagnetic harmonics into the permanent magnet is a problem to be solved urgently.

A motor rotor, especially a permanent magnet motor rotor, often needs a shielding layer to shield a harmonic magnetic field into a permanent magnet. But the shielding layer itself may generate eddy current loss under an action of a high-frequency electromagnetic field, leading to heat generation. Therefore, it is necessary to improve heat dissipation efficiency of the shielding layer while shielding the harmonic magnetic field into the permanent magnet.

Based on this, the present disclosure provides a motor rotor and a permanent magnet motor, so as to improve the heat dissipation efficiency of the shielding layer while shielding an electromagnetic harmonics into the permanent magnet to prevent the shielding layer from overheating locally.

Figure 2:
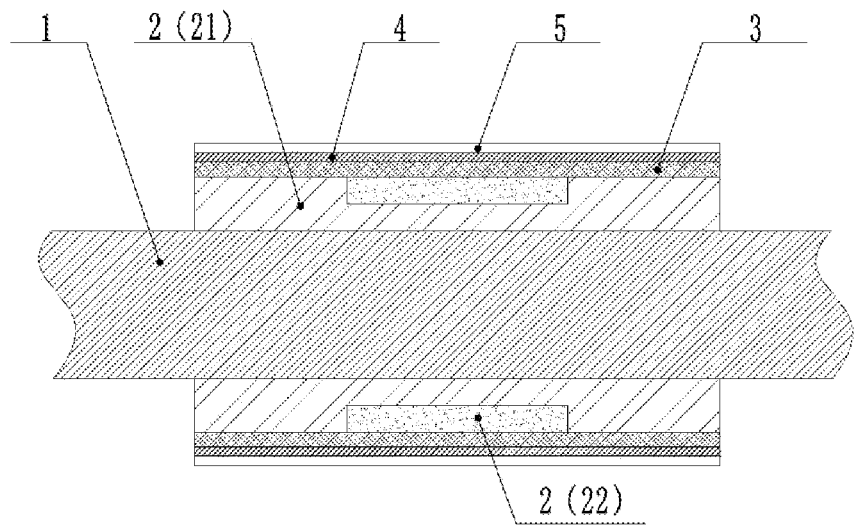
FIG. 2 is a schematic diagram of a motor rotor according to other embodiments of the present disclosure.

As shown in FIG. 1 and FIG. 2, the motor rotor according to some embodiments of the present disclosure includes: a rotating shaft 1, a magnetic layer 2, a first heat diffusion layer 3 and a shielding layer 4.

The magnetic layer 2 is fixedly sleeved on the rotating shaft 1. The magnetic layer 2 may have a ring structure, a middle part of which may be provided with a connecting hole, and the rotating shaft 1 passes through the connecting hole and is fixed on the magnetic layer 2.

Optionally, the magnetic layer may be made of magnetic steel, and a magnetic steel glue may be coated on a contact surface of the magnetic layer 2 and the rotating shaft 1, so as to fix the magnetic layer 2 on the rotating shaft.

The first heat diffusion layer 3 wraps on an outer surface of the magnetic layer 2 away from the rotating shaft 1 for preventing a shielding layer 4 from overheating locally. The first heat diffusion layer 3 may have a ring structure so as to be sleeved outside the magnetic layer 2. The first heat diffusion layer 3 may be in interference fit with the magnetic layer 2, so that the first heat diffusion layer 3 provides a certain pre-pressure for the magnetic layer 2. Generally, the magnetic layer 2 may be a permanent magnet that is compressive, but not tensile.

The shielding layer 4 wraps on a surface of the first heat diffusion layer 3 away from the magnetic layer. One side of the shielding layer 4 away from the first heat diffusion layer 3 may directly contact surrounding environment, thereby accelerating the heat dissipation efficiency of the shielding layer to the surrounding environment.

The shielding layer may be made of a metal material such as copper, which may shield the harmonic magnetic field and reduce the eddy current loss in the permanent magnet.

Due to the eddy current loss, temperature of the shielding layer itself may be increased during use, it is necessary to improve the heat dissipation efficiency of the shielding layer to improve heat dissipation of the motor rotor itself, so as to prevent the magnetic layer of the motor rotor from being affected by too high local temperature of the shielding layer. Too high temperature of the magnetic layer may cause permanent demagnetization.

Therefore, in some embodiments of the present disclosure, the first heat diffusion layer is provided between the magnetic layer and the shielding layer. A function of the first heat diffusion layer is to absorb heat of the shielding layer and make the heat propagate along an extension direction of the first heat diffusion layer, i.e., an axial direction of the rotating shaft 1. The extension direction herein refers to a direction parallel to the shielding layer and the magnetic layer, so as to prevent the heat from gathering locally in the shielding layer, so that an entire of the shielding layer is in a thermally uniform state. The partial demagnetization of the magnetic layer may be avoided by preventing the local temperature from being too high. When the high local temperature occurs in the shielding layer, the heat is diffused to the entire of the shielding layer, i.e., a heat dissipation area of the shielding layer is increased to improve performance of the heat dissipation.

In some embodiments of the present disclosure, the first heat diffusion layer may be a whole which is in contact with all surfaces of the shielding layer close to the magnetic layer. Therefore, when the shielding layer has cracks or includes multiple separated parts, the heat of one part of the shielding layer may be transferred to other parts by the first heat diffusion layer, so as to increase the heat dissipation area of the shielding layer to promote the heat dissipation and prevent the shielding layer from overheating locally.

In some embodiments, a first thermal conductivity of the first heat diffusion layer 3 along a thickness direction (i.e., a radial direction of the rotating shaft 1) is smaller than a second thermal conductivity of the first heat diffusion layer along an extension direction (i.e., the axial direction of the rotating shaft 1).

In some embodiments, the first heat diffusion layer includes a first carbon fiber layer, which is made of a carbon fiber. A radial direction of the first carbon fiber layer is parallel to the thickness direction of the first heat diffusion layer 3, and a fiber direction of the first carbon fiber layer is parallel to the extension direction of the first heat diffusion layer 3.

The radial direction of the first carbon fiber layer is a direction from the magnetic layer to the shielding layer, and the fiber direction of the first carbon fiber layer is parallel to the shielding layer. A thermal conductivity of a carbon fiber material in the fiber direction is high, reaching 700 W/(m·K), while a thermal conductivity of the carbon fiber material in the radial direction is relatively low, about 6.5 W/(m·K). The thermal conductivity in the radial direction is low but failing to achieve thermal insulation, so that the first heat diffusion layer itself may have a certain heat absorption effect. In this case, when the heat of the magnetic layer 2 is too high, the demagnetization of the magnetic layer 2 may not occur due to the first heat diffusion layer failing to transfer the heat. At this time, the first heat diffusion layer 3 also acts as a protective cover for the magnetic layer, which may provide a certain pre-pressure for the magnetic layer. The carbon fiber material itself has low conductivity, which may not cause the eddy current loss, and the carbon fiber material has characteristics of high strength and low thermal expansion coefficient, which is beneficial to save a space of the rotating shaft.

In some embodiments, as shown in FIG. 1 and FIG. 2, the motor rotor further includes: a second heat diffusion layer 5. The second heat diffusion layer 5 wraps on an outer surface of the shielding layer 4 away from the magnetic layer 2.

In some embodiments of the present disclosure, on the one hand, the second heat diffusion layer 5 may further ensure uniform heat distribution of the shielding layer. On the other hand, the second heat diffusion layer 5 may directly contact the surrounding environment to diffuse the heat of the shielding layer 4 into the surrounding environment.

In some embodiments, the second heat diffusion layer is made of a non-metallic thermal conductive material, which may be a composite of an insulating thermally conductive inorganic particle and polymer body.

The inorganic particle may be selected from boron nitride, silicon nitride, and aluminum oxide, and may also use a metal particle. I.e., the metal particle is embedded in the polymer body as the second heat diffusion layer. At this time, the metal particle in the polymer body may absorb a certain harmonic magnetic field, reducing a total amount of the harmonic magnetic field absorbed by the shielding layer, thereby reducing overall temperature of the shielding layer, and the metal particle is dispersed in the polymer body, so the heat dissipation efficiency is relatively high.

In some embodiments, the polymer body may be made of a carbon fiber material. The carbon fiber material is a multilayer structure, a fiber direction of which is parallel to the shielding layer 4, and a radial direction of which is a direction from the shielding layer 4 to the second heat diffusion layer 5.

The carbon fiber material has a very high thermal conductivity in the fiber direction and a relatively low thermal conductivity in the radial direction. Therefore, a metal fiber may be provided in the carbon fiber layer. An extension direction of the metal fiber is a radial direction of the carbon fiber layer. The metal fiber is in contact with carbon in each layer of the carbon fiber material, and a size of the metal fiber is relatively small, so strength of the carbon fiber layer along the fiber direction may not be damaged. And, the metal fiber may not only absorb the harmonic magnetic field, but also improve the thermal conductivity of a whole of the carbon fiber layer along the radial direction, thereby speeding up heat transfer efficiency from the shielding layer 4 to the second heat diffusion layer 5 and accelerating the heat dissipation.

In some embodiments, the second heat diffusion layer 5 includes a second carbon fiber layer, a radial direction of the second carbon fiber layer is parallel to a thickness direction of the second heat diffusion layer, and a fiber direction of the second carbon fiber layer is parallel to an extension direction of the second heat diffusion layer, i.e., the axial direction of the rotating shaft 1.

Figure 3:
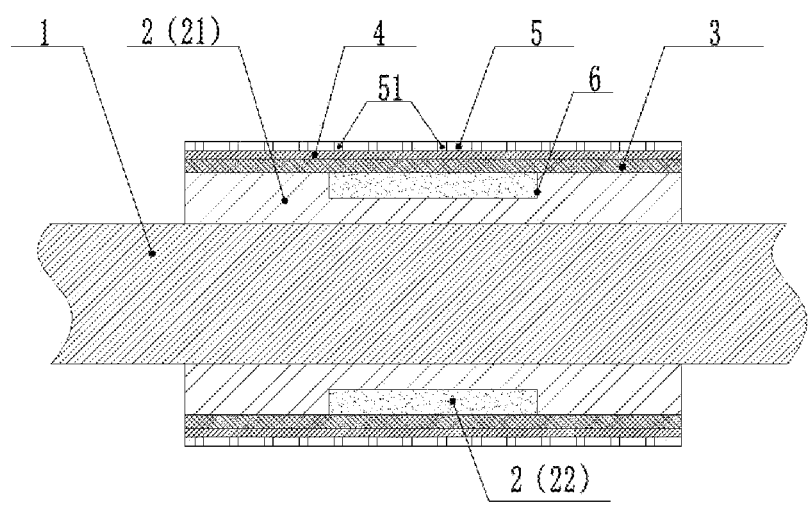
FIG. 3 is a schematic diagram of a motor rotor according to other embodiments of the present disclosure.

In some embodiments, as shown in FIG. 3, the second carbon fiber layer 5 is provided with a plurality of metal heat conducting parts 51. The plurality of metal heat conducting parts 51 extend along the radial direction of the second carbon fiber layer for improving a thermal conductivity of the second carbon fiber layer along the radial direction.

The second carbon fiber layer has a multilayer structure, and the thermal conductivity between the layers is relatively low. In order to improve the thermal conductivity of the second carbon fiber layer along the radial direction, the plurality of metal heat conducting parts 51 are provided. The plurality of metal heat conducting parts 51 may penetrate the second carbon fiber layer and contact the shielding layer.

In some embodiments, one end of the metal heat conducting part 51 may be fixedly provided on the shielding layer, or may be integrally connected with the shielding layer. I.e., a plurality of metal probes are protruded on the shielding layer. The plurality of metal probes penetrate or not penetrate the second carbon fiber layer. Therefore, on the one hand, the thermal conductivity of the second carbon fiber layer along the radial direction is improved to accelerate heat emission to external environment. On the other hand, a contact area between the shielding layer and the second carbon fiber layer is increased to improve the heat transfer efficiency.

Optionally, as described above, in a method for mixing the metal fiber in the second carbon fiber layer, the extension direction of the metal fiber may be randomly distributed or may be the fiber direction of the second carbon fiber layer. A length of the metal fiber is preferably 10 nm-20 nm. Within the above mentioned size range of the metal fiber, the strength of the second carbon fiber layer along the fiber direction may not be damaged, and the thermal conductivity of the second carbon fiber layer in the radial direction may be improved. The metal fiber itself may also absorb the harmonic magnetic field. A specific surface area of the metal fiber is a large, and therefore, the heat transfer efficiency of the second carbon fiber layer is extremely high.

In some embodiments, the first heat diffusion layer and the second heat diffusion layer are made of a same material, and a thickness of the first heat diffusion layer 3 is greater than that of the second heat diffusion layer.

For example, the first heat diffusion layer 3 includes the first carbon fiber layer, and the second heat diffusion layer 5 includes the second carbon fiber layer. According to the Fick's first law and the Fick's second law, a rate of heat transfer is proportional to a temperature gradient. Therefore, setting the thickness of the first heat diffusion layer 3 to be greater than that of the second heat diffusion layer 5 is to reduce the temperature gradient between the shielding layer 4 and the magnetic layer 2 and increase the temperature gradient between the shielding layer 4 and the environment on one side of the second heat diffusion layer 5 away from the shielding layer, which promotes, the shielding layer 4 to transfer high temperature generated after absorbing the harmonic magnetic field to the second thermal diffusion layer 5 and improves a heat transmission speed to prevent the shielding layer 4 from transferring the heat to the magnetic layer 2. And because the first heat diffusion layer 3 itself is not a heat insulating layer or a adiabatic layer, the first heat diffusion layer 3 may absorb part heat of the shielding layer 4 and the magnetic layer 2 to slow down a heating rate of the shielding layer 4 while preventing the shielding layer 4 or the magnetic layer 2 from overheating locally. The thermal conductivity of the first heat diffusion layer 3 along its own extension direction is greater than that of the first heat diffusion layer 3 along its own thickness direction. The thickness direction of the first heat diffusion layer 3 is a direction from the magnetic layer 2 to the shielding layer 4, and the extension direction is perpendicular to the thickness direction.

In some embodiments, the first heat diffusion layer 3 is in interference fit with the magnetic layer 2.

In some embodiments, the second heat diffusion layer 5 is in interference fit with the shielding layer 4.

The first heat diffusion layer 3 serves as a sheath at this time, providing a certain pre-pressure for the magnetic layer to prevent the magnetic layer 2 from separating from the rotating shaft when the rotor rotates at high speeds, and to prevent the permanent magnets from being torn into multiple fragments under an action of centrifugal force when there are permanent magnets in the magnetic layer.

In some embodiments, as shown in FIG. 1, the magnetic layer 2 is a ring-shaped permanent magnet. The shielding layer 4 is a whole, and a mounting hole is provided in the middle part of the ring-shaped permanent magnet. The rotating shaft passes through the mounting hole. A magnetic steel glue is provided between the permanent magnet and the rotating shaft for connecting the permanent magnet and the rotating shaft.

Or, as shown in FIG. 2, the magnetic layer 2 includes a fixing device 21 and a permanent magnet 22. As shown in FIG. 3, the fixing device 21 is fixedly sleeved on the rotating shaft 1, a mounting groove 6 is provided on an outer surface of the fixing device 21 away from the rotating shaft 1, and the permanent magnet 22 is installed in the mounting groove 6.

The fixing device 21 may be in interference fit with the rotating shaft so as to be pressed on the rotating shaft. A size of the mounting groove 6 on the fixing device 21 is smaller than that of the permanent magnet 22, so that the fixing device 21 is in interference fit with the permanent magnet 22, thereby providing a pre-pressure for the permanent magnet 22. The permanent magnet 22 is compressive, but not tensile, and therefore, the permanent magnet is prevented from being broken by adding the pre-pressure. The fixing device 21 and the permanent magnet 22 may be installed together to form a circular ring structure, and the first heat diffusion layer 3, the shielding layer 4 and the second heat diffusion layer 5 may all be the circular ring structures nested together.

In some embodiments, the magnetic layer 2 includes the fixing device 21 and the permanent magnet 22.

The fixing device 21 is made of a heat storage material. The fixing device made of the heat storage material may absorb the heat generated on the permanent magnet 22 and prevent the permanent magnet from overheating. For example, a phase change heat storage material may be selected, and a phase change temperature of the phase change heat storage material is 5-10° C. lower than a demagnetization temperature of the permanent magnet 22. When a temperature of the permanent magnet 22 increases, the temperature may be transferred to the fixing device 21. When the temperature of the permanent magnet 22 is about to reach its corresponding demagnetization temperature, the fixing device generates a phase change to accelerate absorption of the heat on the permanent magnet 22, and a certain volume change may be generated in a phase change process. The fixing device 21 is made of a material whose volume increases during the phase change. When the temperature of the permanent magnet 22 rises to near the demagnetization temperature, it indicates that the motor has been used for a long time and operating intensity is relatively great. At this time, the fixed device 21 generates the phase change to increase the volume, which may increase a pressure between the permanent magnet 22 and the fixed device 21, thereby preventing the permanent magnet 22 from being broken due to long-term and high-strength use of the rotor. In addition, increasing the pressure between the permanent magnet 22 and the fixing device 21 may reduce a gap between the permanent magnet 22 and the fixing device 21, which increases a contact area between each other, thereby improving the heat transfer efficiency. It should be noted that volume change during the phase change of the fixing device should not be too large. Preferably, the volume change is not more than 1% to prevent other layers from being broken.

In some embodiments according to the present disclosure, the permanent magnet includes a neodymium magnet or a samarium cobalt magnet. These two kinds of magnets have strong magnetism, good magnetic retention, and high demagnetization temperature.

In some embodiments, the shielding layer 4 is made of the metal material. Specifically, the shielding layer 4 is made of copper.

In some embodiments, a thickness of the shielding layer 4 is greater than 0.03 mm and less than 1.5 mm. Within a certain range, as the thickness of the shielding layer increases, effect becomes more obvious. But if the thickness is too small (such as less than 0.03 mm), eddy current density in the shielding layer may increase sharply. When the thickness is too large (such as greater than 1.5 mm), the improvement effect may not increase. On the contrary, it may occupy a space of a high-strength protective sleeve and a weight of the rotor. Therefore, in order to prevent excessive eddy current loss induced in the shielding layer from affecting the effect of reducing the eddy current loss of the rotor, and not to affect a thickness of the protective sleeve, the shielding layer should ensure a certain thickness.

In order to better illustrate beneficial effects according to the present disclosure, a preferred embodiment is presented below.

The shielding layer of the rotor according to the present disclosure adopts a high conductivity metal material, preferably a copper shielding layer. The carbon fiber layer serving as the first heat diffusion layer is provided between the shielding layer and the magnetic layer. One side of the shielding layer away from the first heat diffusion layer is provided with the second heat diffusion layer. Preferably, a carbon fiber thickness of the second heat diffusion layer is smaller than that of the first heat diffusion layer, so that the heat in the shielding layer may be transferred easily.

In the embodiment, the motor rotor is mainly composed of the rotating shaft, the permanent magnet, the shielding layer and the two carbon fiber layers.

The permanent magnet is made of a neodymium iron boron material or a samarium cobalt material. The magnetic steel adopts a ring structure, and its inner surface is bonded to the rotating shaft with a special magnetic steel glue. Then a carbon fiber sheath is bound on an outer surface of the magnetic steel, i.e., the first heat diffusion layer. The shielding layer is made of the high conductivity metal material, preferably the copper shielding layer. The shielding layer covers an outer surface of an inner carbon fiber sheath, which may be connected through small gaps, transitions or interference. The thickness of the shielding layer is h, 0.03 mm<h<1.5 mm.

The shielding layer according to the present disclosure not only shields the electromagnetic harmonics into the permanent magnet to a large extent, and reduces the eddy current loss on the surface of the permanent magnet, but also improves the heat dissipation efficiency of the shielding layer itself.

The present disclosure also provides a permanent magnet motor, including any one of the motor rotors according to the present disclosure.

In the description of the present disclosure, it should be appreciated that the terms "first", "second", "third" and other terms used to define parts are only for the convenience of distinguishing the above mentioned parts. Unless otherwise stated, the above words have no special meaning, and therefore cannot be understood as limiting the scope of protection of the present disclosure.

Finally, it should be noted that the above embodiments are only used to illustrate the technical solutions of the present disclosure and not to limit it. Although the present disclosure has been described in detail with reference to the preferred embodiments, those of ordinary skill in the field should understand that: the specific embodiments according to the present disclosure may still be modified or some technical features may be equivalently replaced without departing from the spirit of the technical solutions of the present disclosure, which should be included in the scope of the technical solutions claimed by present disclosure.

What is claimed is:

1. A motor rotor, comprising:
   a rotating shaft;
   a magnetic layer fixedly sleeved on the rotating shaft;
   a first heat diffusion layer wrapped on an outer surface of the magnetic layer away from the rotating shaft for preventing a shielding layer from overheating locally; and
   the shielding layer wrapped on a surface of the first heat diffusion layer away from the magnetic layer and made of a metal material;
   wherein the motor rotor further comprises:
   a second heat diffusion layer;
   the second heat diffusion layer wraps on an outer surface of the shielding layer away from the magnetic layer; and
   the second heat diffusion layer comprises a second carbon fiber layer.

2. The motor rotor according to claim 1, wherein a first thermal conductivity of the first heat diffusion layer along a radial direction of the rotating shaft is smaller than a second thermal conductivity of the first heat diffusion layer along an axial direction of the rotating shaft.

3. The motor rotor according to claim 1, wherein the first heat diffusion layer comprises a first carbon fiber layer, a radial direction of the first carbon fiber layer is parallel to a thickness direction of the first heat diffusion layer, and a fiber direction of the first carbon fiber layer is parallel to an axial direction of the rotating shaft.

4. The motor rotor according to claim 1, wherein a radial direction of the second carbon fiber layer is parallel to a thickness direction of the second heat diffusion layer, and a fiber direction of the second carbon fiber layer is parallel to an axial direction of the rotating shaft.

5. The motor rotor according to claim 4, wherein the second heat diffusion layer comprises a plurality of metal heat conducting parts provided in the second carbon fiber layer, and the plurality of metal heat conducting parts extend along the radial direction of the second carbon fiber layer for improving a thermal conductivity of the second carbon fiber layer along the radial direction.

6. The motor rotor according to claim 1, wherein the first heat diffusion layer and the second heat diffusion layer are made of a same material, and a thickness of the first heat diffusion layer is greater than that of the second heat diffusion layer.

7. The motor rotor according to claim 1, wherein the first heat diffusion layer is in interference fit with the magnetic layer.

8. The motor rotor according to claim 1, wherein the magnetic layer is a ring permanent magnet; or,
   the magnetic layer comprises a fixing device and a permanent magnet, the fixing device is fixedly sleeved on the rotating shaft, a mounting groove is provided on an outer surface of the fixing device away from the rotating shaft, and the permanent magnet is installed in the mounting groove.

9. The motor rotor according to claim 8, wherein the magnetic layer comprises the fixing device and the permanent magnet, and the fixing device is made of a heat storage material.

10. The motor rotor according to claim 8, wherein the permanent magnet comprises a neodymium magnet or a samarium cobalt magnet.

11. The motor rotor according to claim 1, wherein a thickness of the shielding layer is greater than 0.03 mm and less than 1.5 mm.

12. A permanent magnet motor, comprising a motor rotor, wherein the motor rotor comprises:
    a rotating shaft;
    a magnetic layer fixedly sleeved on the rotating shaft;
    a first heat diffusion layer wrapped on an outer surface of the magnetic layer away from the rotating shaft for preventing a shielding layer from overheating locally; and
    the shielding layer wrapped on a surface of the first heat diffusion layer away from the magnetic layer and made of a metal material;
    the motor rotor further comprises: a second heat diffusion layer;
    the second heat diffusion layer wraps on an outer surface of the shielding layer away from the magnetic layer; and
    the second heat diffusion layer comprises a second carbon fiber layer.

13. The permanent magnet motor according to claim 12, wherein a first thermal conductivity of the first heat diffusion layer along a radial direction of the rotating shaft is smaller than a second thermal conductivity of the first heat diffusion layer along an axial direction of the rotating shaft.

14. The permanent magnet motor according to claim 12, wherein the first heat diffusion layer comprises a first carbon fiber layer, a radial direction of the first carbon fiber layer is parallel to a thickness direction of the first heat diffusion layer, and a fiber direction of the first carbon fiber layer is parallel to an axial direction of the rotating shaft.

15. The permanent magnet motor according to claim 12, wherein a radial direction of the second carbon fiber layer is parallel to a thickness direction of the second heat diffusion layer, and a fiber direction of the second carbon fiber layer is parallel to an axial direction of the rotating shaft.

16. The permanent magnet motor according to claim 15, wherein the second heat diffusion layer comprises a plurality of metal heat conducting parts provided in the second carbon fiber layer, and the plurality of metal heat conducting parts extend along the radial direction of the second carbon fiber layer for improving a thermal conductivity of the second carbon fiber layer along the radial direction.

17. The permanent magnet motor according to claim 12, wherein the first heat diffusion layer and the second heat diffusion layer are made of a same material, and a thickness of the first heat diffusion layer is greater than that of the second heat diffusion layer.

18. The permanent magnet motor according to claim 12, wherein the first heat diffusion layer is in interference fit with the magnetic layer.

\* \* \* \* \*